April 22, 1924.
L. K. SNELL
1,491,249
HANDWHEEL
Filed Nov. 29, 1920    2 Sheets-Sheet 1
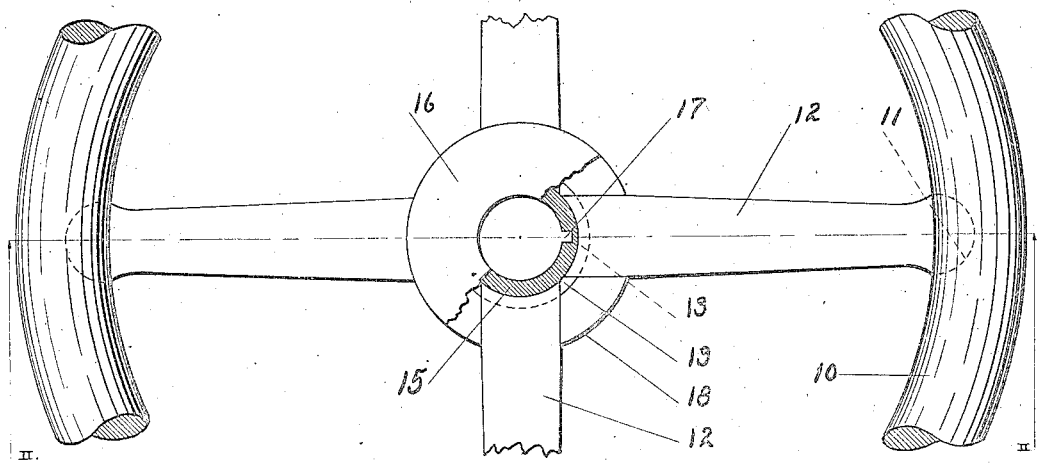
Fig. I.
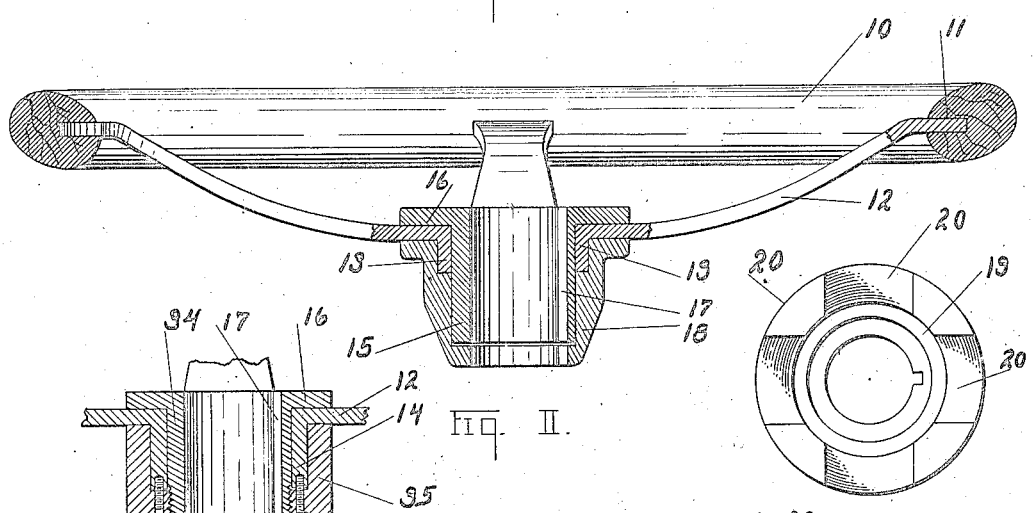
Fig. II.
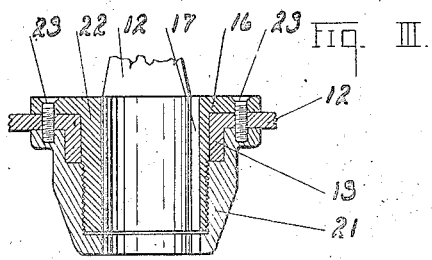
Fig. V.
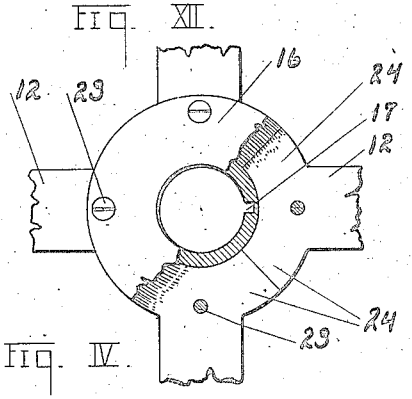
INVENTOR.
Lyle K. Snell.
BY Chester H. Braselton
Harry W. Lindsey Jr.
ATTORNEYS.

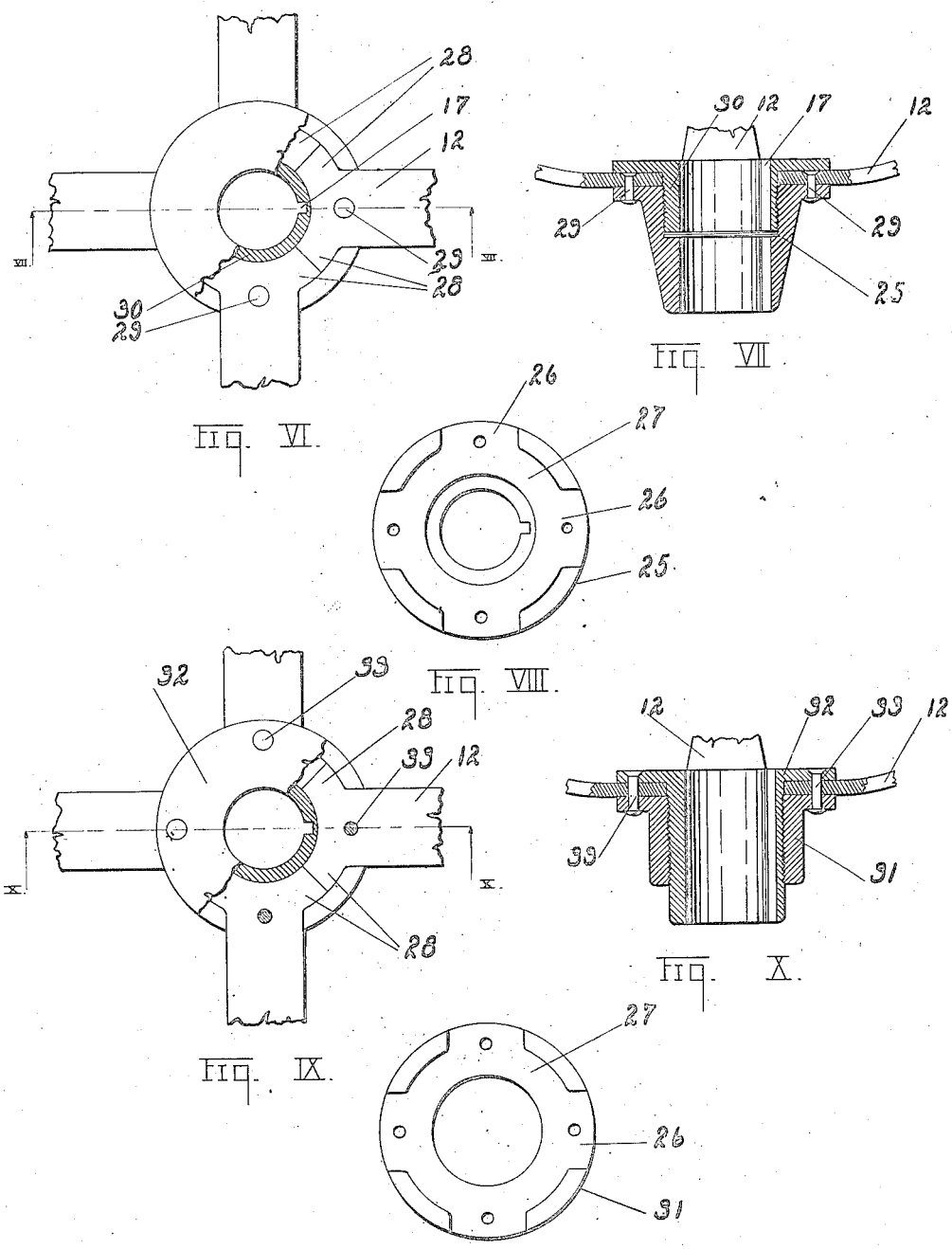

Patented Apr. 22, 1924.

1,491,249

UNITED STATES PATENT OFFICE.

LYLE K. SNELL, OF TOLEDO, OHIO, ASSIGNOR TO THE MULL WOODWORK COMPANY, OF SIDNEY, OHIO.

HANDWHEEL.

Application filed November 29, 1920. Serial No. 427,057.

*To all whom it may concern:*

Be it known that I, LYLE K. SNELL, residing at Toledo, in the county of Lucas and State of Ohio, have invented certain new and useful Improvements in Handwheels, of which I declare the following to be a full, clear, and exact description.

This invention relates to improvements in hand wheels, particularly automobile steering wheels, and to a method of making the same.

Amongst the objects of the invention is the provision of a wheel which is strong and of good appearance, but at the same time, capable of manufacture cheaply. A subsidiary object is the elimination of fastenings between the spokes or arms and the rim of the wheel in order to leave the surface of the latter perfectly smooth and unobstructed.

A further object is the provision of arms of resilient material and the construction of the wheel in such a manner that the arms are flexed slightly in the finished product so as to cause the inherent resilience of the arms to hold their ends extended to a tight fit with the rim, whereby all possibility of loosening of the parts after long usage is avoided.

Still another object is the provision of a structure for the center of the wheel, in which the separate arms may be tightly clamped to prevent movement in all directions and in which the elements making up the central clamping structure, after being once set, are prevented from movement with respect to each other.

Objects relating to details of construction and economies of manufacture, and other objects, will appear as I proceed with the description of that embodiment of the invention which, for the purposes of the present application, I have illustrated in the accompanying drawings, in which:

Figure I is a fragmental, plan view of a hand wheel embodying my invention, part of the hub flanges being broken away in order to more clearly illustrate the parts.

Fig. II is a vertical, sectional view taken approximately on the line II—II of Fig. I.

Fig. III is a detail, plan view of the annular clamping member.

Fig. IV is a fragmental, plan view similar to Fig. I, but showing a modification of the invention.

Fig. V is a vertical, sectional view of a modification of the structure at the center of the wheel, the form and mounting of the arms being as shown in either of Figs. I or IV.

Fig. VI is a view similar to Figs. I and IV, but showing another modification.

Fig. VII is a vertical, sectional view taken on the line VII—VII of Fig. VI.

Fig. VIII is a plan view of the clamping member shown in Figs. VI and VII.

Fig. IX is a plan view of a further modification of the central structure.

Fig. X is a vertical section taken on the line X—X of Fig. IX.

Fig. XI is a plan view of the clamping member of Figs. IX and X.

Fig. XII is a vertical, sectional, detail view of still another modification.

Like reference numerals refer to similar parts throughout the views.

I am well aware of the fact that it has been proposed to make steering wheels by the formation of a spider having a hub and arms integral therewith, and spreading the spider by means of pressure applied to the hub so as to cause the extremities of the arms to enter recesses in the wheel rim. I am also aware that it is old broadly to employ separate arms with interlocking joints at their inner ends. The present invention, however, is clearly differentiated from prior art of this character, because it involves placing the extremities of the separate arms in the rim recesses first, rather than as the final step in the process, and because the arms are made of flat, resilient material which is flexed slightly in a transverse direction when the wheel is assembled, resulting in a constant tendency thereafter for the arms to straighten out and thereby maintain all joints tight.

The rim 10 of the wheel is preferably solid, and the preferred material is wood. At regular intervals along its inner wall, recesses 11 are cut into the rim. These recesses are accurately positioned and gauged as to depth, and they are formed to receive with a tight fit the outer extremities of separate spokes or arms 12. As above stated, these arms are made of resilient material. I have found it very satisfactory to stamp them out of sheet steel of a heavy gauge. The inner extremities of the arms may be flat as shown in the modifications illustrated in Figs. VI to XI inclusive, or the ends may be turned down as shown at 13 in Figs. II and V and at 14 in Fig. XII.

I have illustrated a number of different forms which may be taken by the structure at the center of the wheel. Other modifications than those shown are also within the spirit of the invention. It is essential, however, that there be provided a hub against which the inner ends of the spokes or arms bear in their flexed condition and to which they are secured. It should be understood, however, that I claim invention for some of the details of the different hub structures herein disclosed, as well as for the broad combination of elements and method of manufacture.

In Figures I, II and III, 15 designates the hub member having an upper outwardly extending flange 16 and provided with a key-way 17, by means of which non-rotative connection may be had with the steering post of an automobile, or with any other shaft upon which it may be desired to mount the wheel. The diameter of the hub 15 is slightly greater than the distance between the inner ends of opposing arms when the latter are in their unflexed condition; that is, it is necessary to flex the arms before the hub may be introduced into the space surrounded by the inner ends of the arms. The latter are secured to the hub by means of an annular clamping member 18 to which the hub is joined by a driving fit. The upper, inner side of the clamping member 18 is provided with an annular rabbet 19 for the reception of the downwardly bent ends 13 of the arms, while the radial portions next the ends lie in radial sockets 20 in the top of the member. These sockets prevent any movement of the inner ends of the arms with respect to each other or the clamping member.

In assembling this form of the wheel, the arms are first forced into the recesses 11 in the rim, as is the case with all the forms. The inner ends of the arms are then arranged in the corresponding sockets 20 of the clamping member 18 and the arms 12 flexed sufficiently to bring their inner ends flush with the inner wall of the clamping member. The hub member 16 is then driven past the downwardly bent ends 13 of the arms into the clamping member until the flange 16 engages the arms 12 and holds them firmly in the radial sockets 20. A special press of simple design is employed to facilitate the assembly, but as it forms no part of the present invention, it is not described herein.

In Fig. V is illustrated a clamping member 21 similar in form to the member 18, but internally threaded and employed in connection with an externally threaded hub member 22. In assembling this form of the invention, the hub member 22 is threaded into the clamping member 21 after the arms are flexed sufficiently to withdraw the inner ends thereof from the path of the hub member. When the hub is screwed home, one or more machine screws 23 may be threaded into aligned holes provided in the clamping member 21, hub member 22 and radial arms 12. One such screw is sufficient if sockets such as 20 of Fig. III are provided in the clamping member 21, the screw then serving the purpose merely of locking the parts 21 and 22 against relative rotation. When such sockets are omitted, as is the case in Fig. IV, the screws 23 are useful in preventing movement of the inner ends of the arms with respect to each other and to the hub or clamping member.

In the structure illustrated in Fig. IV, the inner ends of the arms 12 are extended on each side to form quarter segments 24 of an annulus, preferably of the same width as the flange 16 on the hub. As the side edges of each segment 24 abut those next to it on either side, all of the arms are braced against relative movement. Hence, if one arm were positively anchored to the clamping member or to the hub member, the others could not be moved, but I prefer to use a screw 23 for each arm in order to insure sufficient strength.

In Figs. VI, VII and VIII, the construction illustrated differs from that shown in Fig. IV, in that the clamping member 25 is provided with radial sockets 26 merging into a circular socket 27 in which the arms rest, the segments 28 of the arms being narrower than the segments 24 of Fig. IV. In this modification also, rivets 29 are employed for fastening the arms 12 to the clamping member 25 only, the hub member 30 having an uninterrupted upper flange.

The construction of Figs. IX, X and XI is quite similar to that just described, the differences being in the form of the clamping member 31 and hub member 32 and in the fact that the rivets 33 extend through the upper flange of the hub member.

In Fig. XII the hub member 34 and clamping member 35 are threaded together to grip the arms 12, as in some of the previously described forms, but in this figure, the screws 36 are substantially concealed, being inserted upwardly through the clamping member 35 into the depending ends 14 of the arms. In this modification, the clamping member 35 may be formed without radial sockets, if desired, or it may have sockets such as those shown in Figs. III or VIII.

I desire to emphasize the fact that my invention in its broad aspect is not limited to any particular form or construction of the central portion of the wheel, those forms described herein being illustrative only so far as the broad invention is concerned. I desire also to call attention to the fact that the amount of flexure in the arms 12, necessary in assembling the wheel, is relatively slight, and smaller by many times than that which would be necessary in order to withdraw the arms from their sockets in the rim. Furthermore, while the arms 12 are resilient and may be bent readily by the aid of special tools and forms to a degree sufficient for assembling purposes, still they are made from heavy stock and are capable of withstanding the heaviest strains to which they may be subjected in ordinary use without changing their form perceptively.

Having thus described my invention, what I claim as new and desire to secure by Letters Patent is:

1. The herein described method of forming a hand wheel consisting of connecting the rim with separate resilient spokes or arms by means of complementary projections and sockets, flexing said arms so as to increase the space bounded by the inner ends thereof, inserting a hub member in said space and relieving said arms of the flexing stress.

2. The herein described method of forming a hand wheel consisting of recessing the rim at intervals along its inner wall, inserting separate resilient spokes or arms into said recesses, flexing said arms so as to increase the space bounded by the inner ends of the arms, inserting a hub member in said space and relieving said arms of the flexing stress.

3. The herein described method of forming a hand wheel consisting of connecting the rim with separate resilient spokes or arms by means of complementary projections and sockets, flexing said arms so as to increase the space bounded by the inner ends thereof, inserting a hub member in said space and applying fastening means to hold said arms and hub fixed with relation to each other.

4. The herein described method of forming a hand wheel consisting of connecting the rim with separate resilient spokes or arms by means of complementary projections and sockets, arranging the inner ends of said arms in radial sockets in a central, annular clamping member, flexing said arms so as to increase the space bounded by the inner ends thereof, inserting a hub member in said space and securely fastening said hub member and annular clamping member together.

5. The herein described method of forming a hand wheel consisting of connecting the rim with separate resilient spokes or arms by means of complementary projections and sockets, arranging the inner ends of said arms radially on one side of a central annular clamping member, flexing said arms so as to increase the space bounded by the inner ends thereof, inserting a flanged hub member in said space and causing said clamping member to approach the flange on said hub to grip the inner ends of said arms between said flange and clamping member.

6. The herein described method of forming a hand wheel having a rim, separate spokes or arms, and a central portion comprising an annular clamping member and a flanged hub member, one of said two last named members having therein radial sockets adapted to receive the arms, said method consisting in joining the outer ends of the arms to the rim by a projection and socket connection, arranging the inner ends of the arms in said grooves, and causing said clamping member to approach the flange on said hub member to grip the inner ends of the arms between said flange and clamping member.

7. The herein described method of forming a hand wheel having a rim, separate spokes or arms, and a central portion comprising an annular clamping member and a flanged hub member, said members being threaded to permit the hub member to be screwed into the clamping member, and one of said members having therein radial sockets adapted to receive the arms, said method consisting in joining the outer ends of the arms to the rim by a projection and socket connection, arranging the inner ends of the arms in said radial sockets and screwing the hub member into said clamping member to cause the flange on the hub member to press the inner ends of the arms against the said clamping member.

8. The herein described method of forming a hand wheel consisting of connecting the rim with separate resilient arms or spokes by means of complementary projections and sockets, arranging the inner ends of said arms radially on one side of a central, annular, interiorly threaded clamping member, flexing said arms, so as to increase the space bounded by the inner ends thereof, and screwing an externally threaded flanged hub member into said clamping member to grip the inner ends of the arms between said flange and clamping member.

9. The herein described method of forming a hand wheel consisting of recessing the rim at intervals along its inner wall, inserting separate resilient arms or spokes into said recesses, arranging the inner ends of said arms radially on one side of a central, annular, interiorly threaded clamping member, flexing said arms so as to increase the space bounded by the inner ends thereof, and screwing an externally threaded flanged hub member into said clamping member to grip the inner ends of the arms between said flange and clamping member.

10. In a hand wheel, a rim, a hub member, separate spokes or arms of resilient material, having their outer ends connected with said rim by means of complementary projections and sockets and their inner ends separated by said hub, the said arms being flexed slightly so as to cause the inherent resilience thereof to keep the outer ends pressed tightly into engagement with said rim.

11. In a hand wheel, a rim, a hub member, separate spokes or arms of resilient material having their outer ends connected with said rim by means of complementary projections and sockets and their inner ends separated by said hub and secured thereto, the said arms being flexed slightly so as to cause the inherent resilience thereof to keep the outer ends pressed tightly into engagement with said rim.

12. In a hand wheel, a rim, an outwardly flanged hub member, separate spokes or arms of resilient material having their outer ends connected with said rim by means of complementary projections and sockets and their inner ends separated by said hub, an annular clamping member surrounding said hub, said clamping member being arranged to hold the inner ends of the arms against said flange, said arms being flexed slightly so as to cause the inherent resilience thereof to keep the outer ends pressed tightly into engagement with said rim.

13. In a hand wheel, a rim, a hub member, an outwardly extending flange thereon, separate spokes or arms connected at their outer ends with said rim, the inner ends of said arms bearing against said hub and said flange, and an annular clamping member surrounding said hub, said clamping member and said flange being arranged to grip the inner ends of said arms.

14. In a hand wheel, a rim, an outwardly flanged hub member, separate spokes or arms connected at their outer ends with said rim, the inner ends of said arms bearing against said hub and said flange, and an annular clamping member threaded on said hub and provided with a bearing surface adapted to engage said arms on the side opposite said flange.

15. In a hand wheel, a rim, an outwardly flanged hub member, separate spokes or arms connected at their outer ends with said rim, the inner ends of said arms bearing against said hub and said flange, an annular clamping member threaded on said hub and provided with a bearing surface adapted to engage said arms on the side opposite said flange, and means for preventing relative rotation between said hub and clamping member.

16. In a hand wheel, a rim, an outwardly flanged hub member, separate spokes or arms connected at their outer ends with said rim, the inner ends of said arms bearing against said hub and said flange, an annular clamping member threaded on said hub and provided with a bearing surface adapted to engage said arms on the side opposite said flange, and means for preventing movement of the inner ends of said arms relative to said hub in a plane perpendicular to the axis of the wheel.

17. In a hand wheel, a rim, a central portion comprising a flanged hub member and an annular clamping member surrounding said hub member, separate spokes or arms connected at their outer ends with said rim, the inner ends of said arms bearing against the said hub member adjacent the flange thereon, one of said members having radial sockets therein for the reception of said arms, said members being adapted to clamp the arms therebetween.

18. In a hand wheel, a rim, an outwardly flanged hub member, separate spokes or arms connected at their outer ends with said rim, the inner ends of said arms being bent downwardly to lie against the periphery of the hub, and an annular clamping member surrounding said hub and provided with an annular recess upon its upper inner side to receive the down bent ends of the arms, said clamping member having an upper surface adapted to engage the radial portions of the arms to press the same against the flange on the hub member in gripping relation.

19. In a hand wheel, a rim, an outwardly flanged hub member, separate spokes or rims connected at their outer ends with said rim, the inner ends of said arms being bent downwardly to lie against the periphery of the hub, an annular clamping member threaded onto the periphery of the hub and provided with an annular recess upon its upper, inner side to receive the down bent ends of the arms, said clamping member having an upper surface adapted to engage the radial portions of the arms to press the same against the flange on the hub member in gripping relation.

In testimony whereof, I affix my signature.

LYLE K. SNELL.